US012521637B2

(12) United States Patent
Dorn

(10) Patent No.: US 12,521,637 B2
(45) Date of Patent: Jan. 13, 2026

(54) METHODS AND SYSTEM FOR PREDICTING DURATION OF MULTI-PLAYER GAME SESSION

(71) Applicant: Sony Interactive Entertainment Inc., Tokyo (JP)

(72) Inventor: Victoria Dorn, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 652 days.

(21) Appl. No.: 17/867,577

(22) Filed: Jul. 18, 2022

(65) Prior Publication Data

US 2024/0017179 A1 Jan. 18, 2024

(51) Int. Cl.
*A63F 13/795* (2014.01)

(52) U.S. Cl.
CPC .... *A63F 13/795* (2014.09); *A63F 2300/5566* (2013.01)

(58) Field of Classification Search
CPC . A63F 13/79; A63F 13/795; A63F 2300/5566
USPC ........................................................... 463/42
See application file for complete search history.

(56) References Cited

U.S. PATENT DOCUMENTS 10,318,013 B1 * 6/2019 Banks ..................... G06F 9/541
10,449,457 B2 * 10/2019 Sienkiewicz ......... A63F 13/795
10,722,801 B1 7/2020 Curley et al.
10,894,215 B1 * 1/2021 Brown .................... A63F 13/35
11,504,632 B1 * 11/2022 Schuster ............... G06F 16/182
11,872,497 B1 * 1/2024 Schuster ................. A63F 13/77
11,969,649 B2 * 4/2024 Manoharan ............. A63F 13/48
2010/0062834 A1 * 3/2010 Ryan ........................ G07F 17/32 463/43
2011/0047237 A1 * 2/2011 Walsh .................... G06Q 10/10 709/227
2011/0118026 A1 * 5/2011 Lukas ................ G06F 3/04166 463/37
2013/0246942 A1 * 9/2013 Merrifield ............... G06T 13/40 715/757

(Continued)

OTHER PUBLICATIONS

PCT Notification of Transmittal of the International Search Report & the Written Opinion of the International Searching Authority, issued in corresponding PCT/2023/070026, mailed Oct. 2, 2023 (8 total pages).

*Primary Examiner* — Michael A Cuff
(74) *Attorney, Agent, or Firm* — Kilpatrick Townsend & Stockton LLP

(57) ABSTRACT

A method for generating game duration metrics includes assembling a gaming session for a game, with the gaming session identifying a first player and a second player, and accessing a database that includes an historical duration metric for playing the game by each of the first player and the second player. The method also includes accessing contextual data related to the gaming session to be played by the first player and the second player, and generating a prediction of time metrics for the first player and the second player. The predicted time metrics provide an estimated duration time for play of the gaming session. The method further includes executing the gaming session for the first player and the second player. As the gaming session is progressed by the first player and the second player, the duration time for the gaming session is updated periodically.

21 Claims, 6 Drawing Sheets

(56) References Cited

U.S. PATENT DOCUMENTS

| | | | | |
|---|---|---|---|---|
| 2015/0302682 | A1* | 10/2015 | Sareli | G07F 17/323 463/20 |
| 2019/0262706 | A1* | 8/2019 | Trombetta | A63F 13/497 |
| 2019/0275431 | A1* | 9/2019 | Labate | A63F 13/86 |
| 2021/0240771 | A1* | 8/2021 | Namdev | G06F 21/33 |
| 2021/0283510 | A1 | 9/2021 | Reeves et al. | |
| 2021/0331076 | A1 | 10/2021 | Labate | |
| 2022/0021947 | A1* | 1/2022 | Ohno | G09G 5/36 |
| 2022/0047952 | A1* | 2/2022 | Hagström | G06F 9/44521 |
| 2022/0409997 | A1* | 12/2022 | Harris | A63F 13/48 |
| 2023/0051771 | A1* | 2/2023 | Fortuna | A63F 13/49 |
| 2023/0065943 | A1* | 3/2023 | Fukuya | G06T 11/40 |
| 2024/0212288 | A1* | 6/2024 | Singh | G06F 3/013 |
| 2024/0335738 | A1* | 10/2024 | Lake-Schaal | A63F 13/795 |

* cited by examiner

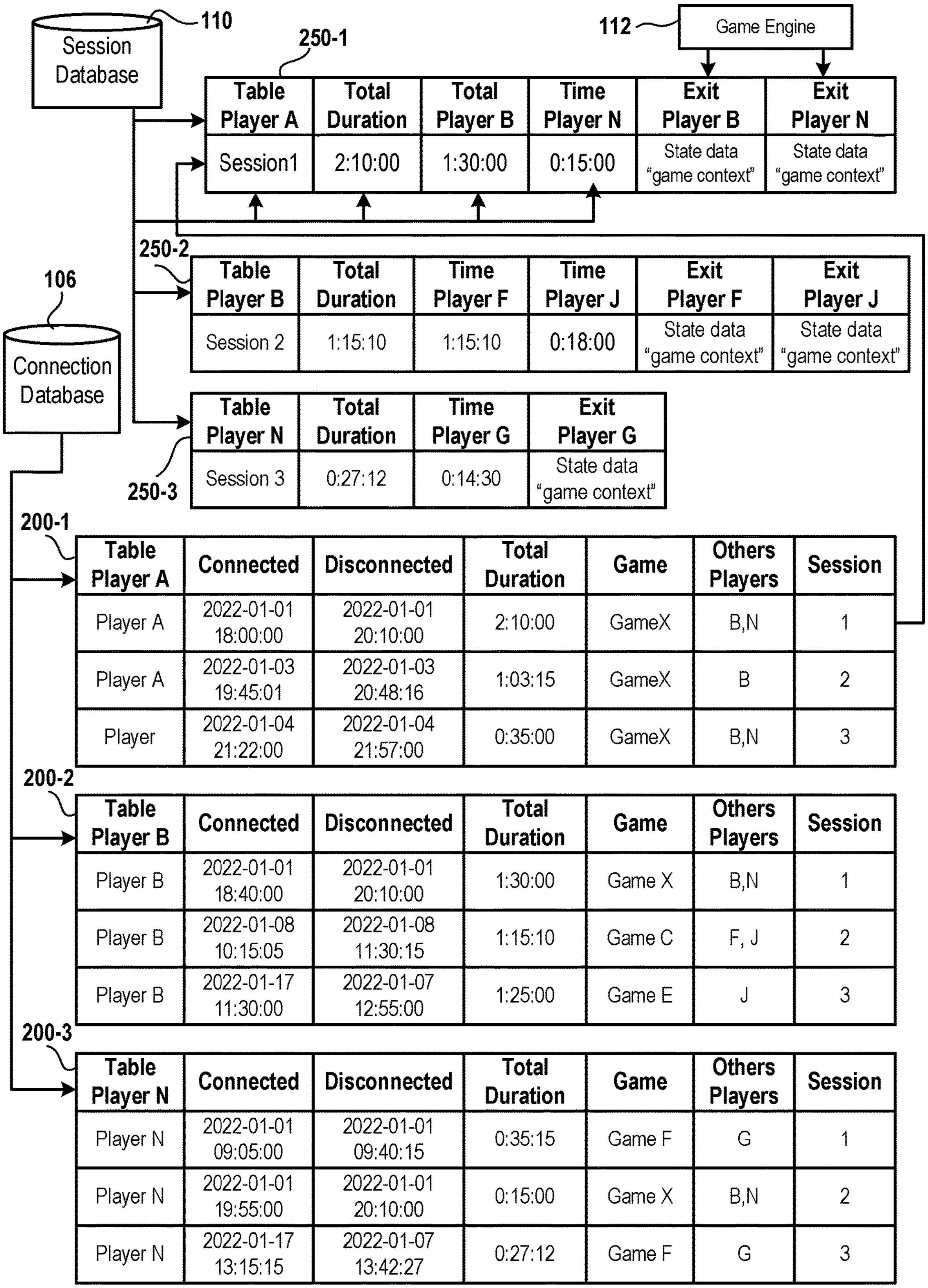

| Table Player A | Total Duration | Total Player B | Time Player N | Exit Player B | Exit Player N |
|---|---|---|---|---|---|
| Session1 | 2:10:00 | 1:30:00 | 0:15:00 | State data "game context" | State data "game context" |

| Table Player B | Total Duration | Time Player F | Time Player J | Exit Player F | Exit Player J |
|---|---|---|---|---|---|
| Session 2 | 1:15:10 | 1:15:10 | 0:18:00 | State data "game context" | State data "game context" |

| Table Player N | Total Duration | Time Player G | Exit Player G |
|---|---|---|---|
| Session 3 | 0:27:12 | 0:14:30 | State data "game context" |

| Table Player A | Connected | Disconnected | Total Duration | Game | Others Players | Session |
|---|---|---|---|---|---|---|
| Player A | 2022-01-01 18:00:00 | 2022-01-01 20:10:00 | 2:10:00 | GameX | B,N | 1 |
| Player A | 2022-01-03 19:45:01 | 2022-01-03 20:48:16 | 1:03:15 | GameX | B | 2 |
| Player | 2022-01-04 21:22:00 | 2022-01-04 21:57:00 | 0:35:00 | GameX | B,N | 3 |

| Table Player B | Connected | Disconnected | Total Duration | Game | Others Players | Session |
|---|---|---|---|---|---|---|
| Player B | 2022-01-01 18:40:00 | 2022-01-01 20:10:00 | 1:30:00 | Game X | B,N | 1 |
| Player B | 2022-01-08 10:15:05 | 2022-01-08 11:30:15 | 1:15:10 | Game C | F, J | 2 |
| Player B | 2022-01-17 11:30:00 | 2022-01-07 12:55:00 | 1:25:00 | Game E | J | 3 |

| Table Player N | Connected | Disconnected | Total Duration | Game | Others Players | Session |
|---|---|---|---|---|---|---|
| Player N | 2022-01-01 09:05:00 | 2022-01-01 09:40:15 | 0:35:15 | Game F | G | 1 |
| Player N | 2022-01-01 19:55:00 | 2022-01-01 20:10:00 | 0:15:00 | Game X | B,N | 2 |
| Player N | 2022-01-17 13:15:15 | 2022-01-07 13:42:27 | 0:27:12 | Game F | G | 3 |

FIG. 3

METHODS AND SYSTEM FOR PREDICTING DURATION OF MULTI-PLAYER GAME SESSION

BACKGROUND

To establish an online gaming session, a user typically connects with a gaming service and selects a game to play. If the user is interested in playing a multi-player online game, the user can select one or more users with whom to play the game from a group of users interested in playing the game. The group of users interested in playing the game can be assembled by the gaming service and displayed to the user via a suitable interface for selection. One drawback with this approach is that the user does not have any information regarding the game play history of the users in the group assembled by the gaming service. This can result in an unsatisfying gaming experience for the user.

For example, consider the case in which the user, Player A, wants to play a relatively long game session, e.g., a game session lasting 2 or 3 hours. If Player B, the user Player A selected from the group of other interested users, quits playing the game after just 10 or 15 minutes, then Player A would likely be disappointed to play the game for such a short period of time. Alternatively, if Player B does in fact play a relatively long game session but takes game play breaks every 5 or 10 minutes, then Player A would likely get frustrated with the sporadic nature of the game play.

It is in this context that embodiments arise.

SUMMARY

In an example embodiment, a method for generating game duration metrics is provided. The method includes assembling a gaming session for a game, with the gaming session identifying a first player and a second player, and accessing a database that includes an historical duration metric for playing the game by each of the first player and the second player. The method also includes accessing contextual data related to the gaming session to be played by the first player and the second player, and generating a prediction of time metrics for the first player and the second player. The predicted time metrics provide an estimated duration time for play of the gaming session. The method further includes executing the gaming session for the first player and the second player. As the gaming session is progressed by the first player and the second player, the duration time for the gaming session is updated periodically.

In one embodiment, the method further includes receiving a selection of a third player and removal of the second player, and reexecuting the generating of the prediction of the time metrics to generate predicted time metrics for the first player and the third player. In one embodiment, the accessing of the database that includes the historical duration metric includes accessing a connection database that includes connection use data regarding gameplay of the game by a player. In one embodiment, the connection use data regarding gameplay of the game by the player includes metadata identifying a connection time for the player, a disconnection time for the player, and a total duration of gameplay of the game by the player.

In one embodiment, the accessing of the contextual data related to the gaming session to be played by the first player and the second player includes accessing a session database that includes metadata regarding a gaming session and state data regarding the gaming session. In one embodiment, the metadata regarding the gaming session includes metadata regarding duration of the gaming session and metadata regarding connection time for players in the gaming session. In one embodiment, the state data regarding the gaming session includes state data regarding a state of gameplay in the gaming session, state data regarding players involved in the gaming session, state data regarding players leaving the gaming session, and state data regarding a game context in which a player left the gaming session.

In one embodiment, the predicted time metrics also provide estimated duration times for gameplay breaks taken during the gaming session. In one embodiment, the method further includes generating display data for rendering to one or both of the first player and the second player to display the estimated duration time for play of the gaming session, and receiving an indication from the first player and the second player that the gaming session is to proceed before executing the gaming session. In one embodiment, the method further includes generating display data for rendering to the first player a recommendation to proceed with the executing of the gaming session with the second player.

In another example embodiment, a method for generating game duration metrics is provided. The method includes assembling a gaming session for a game, with the gaming session identifying a first player and an option of one or more other players, and accessing a database that includes an historical duration metric for playing the game by the first player and at least one of the other players. The method also includes accessing contextual data related to the gaming session to be played by the first player and at least one of the other players, and generating a prediction of time metrics for the first player and at least one of the other players. The predicted time metrics provide an estimated duration time for play of the gaming session. The method further includes executing the gaming session for the first player and at least one of the other players. As the gaming session is progressed by the first player and at least one of the other players, the duration time for the gaming session is updated periodically.

In one embodiment, the accessing of the database that includes the historical duration metric includes accessing a connection database that includes connection use data regarding gameplay of the game by a player. In one embodiment, the connection use data regarding gameplay of the game by the player includes metadata identifying a connection time for the player, a disconnection time for the player, and a total duration of gameplay of the game by the player. In one embodiment, the accessing of the contextual data related to the gaming session to be played by the first player and at least one of the other players includes accessing a session database that includes metadata regarding a gaming session and state data regarding the gaming session. In one embodiment, the metadata regarding the gaming session includes metadata regarding duration of the gaming session and metadata regarding connection time for players in the gaming session. In one embodiment, the state data regarding the gaming session includes state data regarding a state of gameplay in the gaming session, state data regarding players involved in the gaming session, state data regarding players leaving the gaming session, and state data regarding a game context in which a player left the gaming session.

In one embodiment, the predicted time metrics also provide estimated duration times for gameplay breaks taken during the gaming session. In one embodiment, the method also includes generating display data for rendering to either the first player or to the first player and at least one of the other players to display the estimated duration time for play of the gaming session, and receiving an indication from the first player and at least one of the other players that the gaming session is to proceed before executing the gaming session. In one embodiment, the method further includes generating display data for rendering to the first player a recommendation to proceed with the executing of the gaming session with one or more of the other players.

In one embodiment, the estimated duration time for play of the gaming session is for the first player, a second player and one or more of the other players that are assembled to play together in the gaming session or for a team that plays a team-based game during the gaming session, with the team including the first player, the second player, and one or more of the other players.

In yet another example embodiment, a non-transitory computer readable medium containing program instructions for generating game duration metrics is provided. The execution of the program instructions by one or more processors of a computer system causes the one or more processors to carry out the operations of assembling a gaming session for a game, with the gaming session identifying a first player and a second player, accessing a database that includes an historical duration metric for playing the game by each of the first player and the second player, accessing contextual data related to the gaming session to be played by the first player and the second player, generating a prediction of time metrics for the first player and the second player, with the predicted time metrics providing an estimated duration time for play of the gaming session, and executing the gaming session for the first player and the second player. As the gaming session is progressed by the first player and the second player, the duration time for the gaming session is updated periodically.

Other aspects and advantages of the disclosures herein will become apparent from the following detailed description, taken in conjunction with the accompanying drawings, which illustrate by way of example the principles of the disclosures.

BRIEF DESCRIPTION OF THE DRAWINGS

FIG. 3 is a simplified schematic diagram that show additional details regarding the connection database and the session database, in accordance with one embodiment.

DETAILED DESCRIPTION

In the following description, numerous specific details are set forth in order to provide a thorough understanding of the example embodiments. However, it will be apparent to one skilled in the art that the example embodiments may be practiced without some of these specific details. In other instances, process operations and implementation details have not been described in detail, if already well known.

Embodiments of the present invention provide a method and system for predicting how long a video game will last based upon who is playing the game. The method and system also can be used to schedule gameplay breaks. The method and system use historical gameplay metrics from users. In one embodiment, the historical gameplay metrics is metadata that includes state data from one or more prior gameplays of a particular game. In some embodiments, the prior gameplays of the game can be can be either prior gameplays of the game currently being played (or to be played) or prior gameplays of another game with similar game mechanics. Using machine learning, the system can predict the duration of gameplay for each user. By way of example, if a group of players including Player A, Player B, and Player C is playing a multiplayer online game together, the system can provide data to each of these users regarding how long the gaming session is expected to last. In some instances, calendar data from the users can be accessed to enhance the accuracy of the predicted end of the gaming session. This calendar data also can be used to schedule gameplay breaks at times that are desirable to the group of players currently playing the game. The predicted length of a gaming session can be provided to the players in a suitable user interface. Information regarding when the players would most likely want to pause the game for a break (or terminate the gaming session and resume playing at a later time) also can be provided in the user interface.

Figure 1:
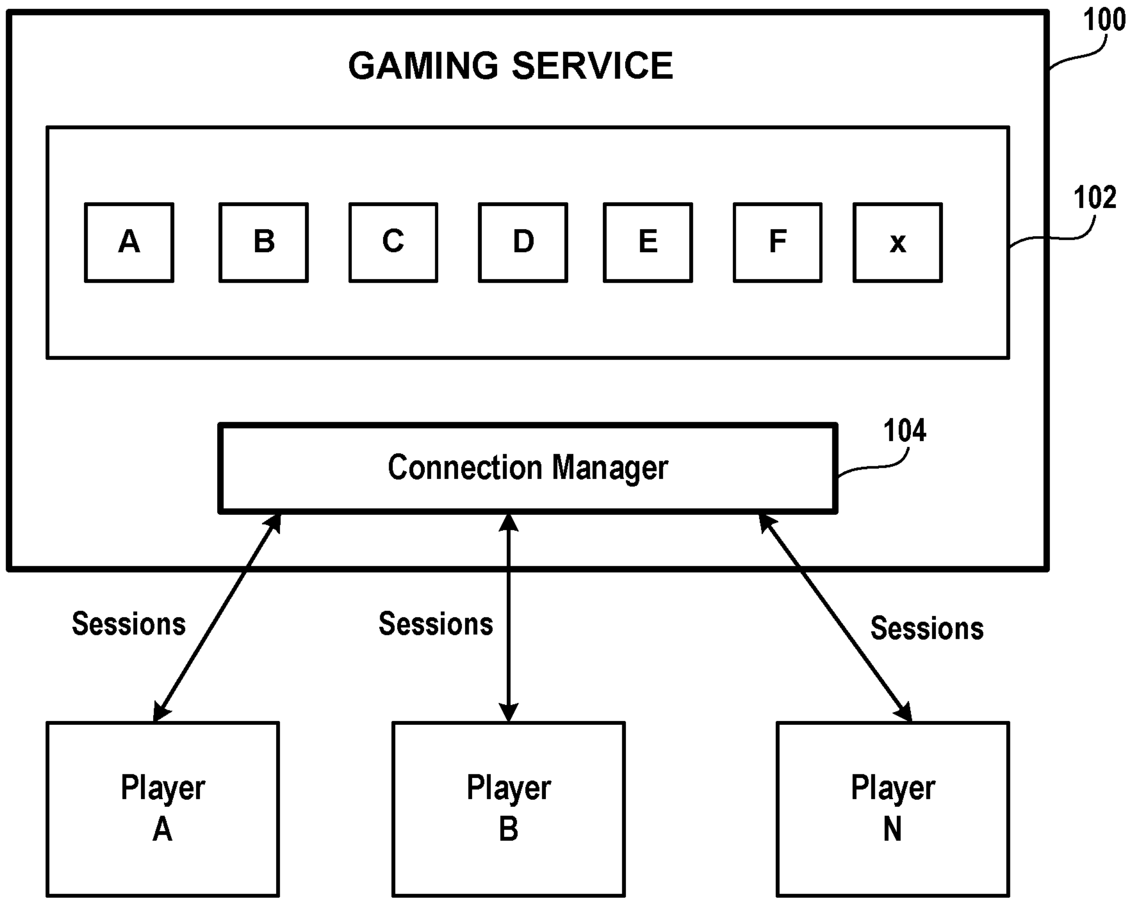
FIG. 1 is a simplified schematic diagram that illustrates the manner in which a player can participate in a multiplayer online video game.

FIG. 1 is a simplified schematic diagram that illustrates the manner in which a player can participate in a multiplayer online video game. As shown in FIG. 1, gaming service 100 hosts a catalog of games (e.g., games A, B, C, D, E, F, and X) on a plurality of game servers 102. In one embodiment, the gaming service 100 is part of a data center that includes, among other infrastructure, servers, data storage, streaming logic, user account management, and other services to enable gaming. In one embodiment, the gaming service is a digital entertainment service, e.g., the PlayStation Network (PSN). Gaming service 100 also includes a connection manager 104 which establishes gaming sessions to play one of the games hosted by the gaming service, e.g., game A, game B, etc. In one embodiment, the gaming sessions are multiplayer gaming sessions, e.g., a gaming session with Player A and Player B, a gaming session with Player A, Player B, and Player N, or a gaming session with more than three players.

As is known to those skilled in the art, players can play video games via console gaming, online gaming, and streaming (cloud) gaming. In console gaming, the video game is loaded onto a game console via disc, cartridge, or digital download, and then executed locally by the game console for display on a screen, e.g., a TV, a computer monitor, etc. In instances in which the game console is connected a game server, e.g., one of the game servers 102 of gaming service 100, the game console can communicate with the game server to provide game status and state data, which can be used to track a player's progress in a game. This enables the game server to monitor the game points accumulated by the player and, when appropriate, award the player with a trophy or add the player's name to a leaderboard. Players typically use console gaming when they want to play a game by themselves. Nevertheless, it is possible to conduct a multiplayer game via console gaming, but the second player (as well as any additional players) must be in the same place physically as the game console.

In multiplayer online gaming, the game is executed by the game consoles of each of the players and the game server is in communication with each of the game consoles. The game can be loaded onto the game consoles of the players via disc, cartridge, or digital download. The game server, which is also executing an instance of the game, receives state data uploaded from each of the game consoles and transmits state data regarding the other players back to each of the game consoles. The state data regarding the other players can include background scenes, characters, character movements, game level, etc. This state data regarding the other players enables the game consoles of each of the other players to reconstruct multiplayer gameplay including all players and to display the reconstructed multiplayer gameplay to the screen, e.g., TV, computer, tablet, etc., connected to the game consoles of each of the players.

In streaming (cloud) gaming involving multiple players, the game is executed on the game server, e.g., one of the game servers 102 of the gaming service 100. The game server receives inputs (e.g., button presses) from the players involved in the game to drive interactivity at the game server and sends back video streams and audio streams to the connected devices of each of the players. By way of example, the connected devices of the players can include a computer, a tablet, a smartphone, a TV, and a head-mounted display (HMD). By way of example, when a player presses the "jump" button for a character, this input is uploaded to the game server and, usually within about 250 to 500 milliseconds, the game server sends back video frames showing the character jumping for display on the screen of each of the player's connected devices.

Figure 2:
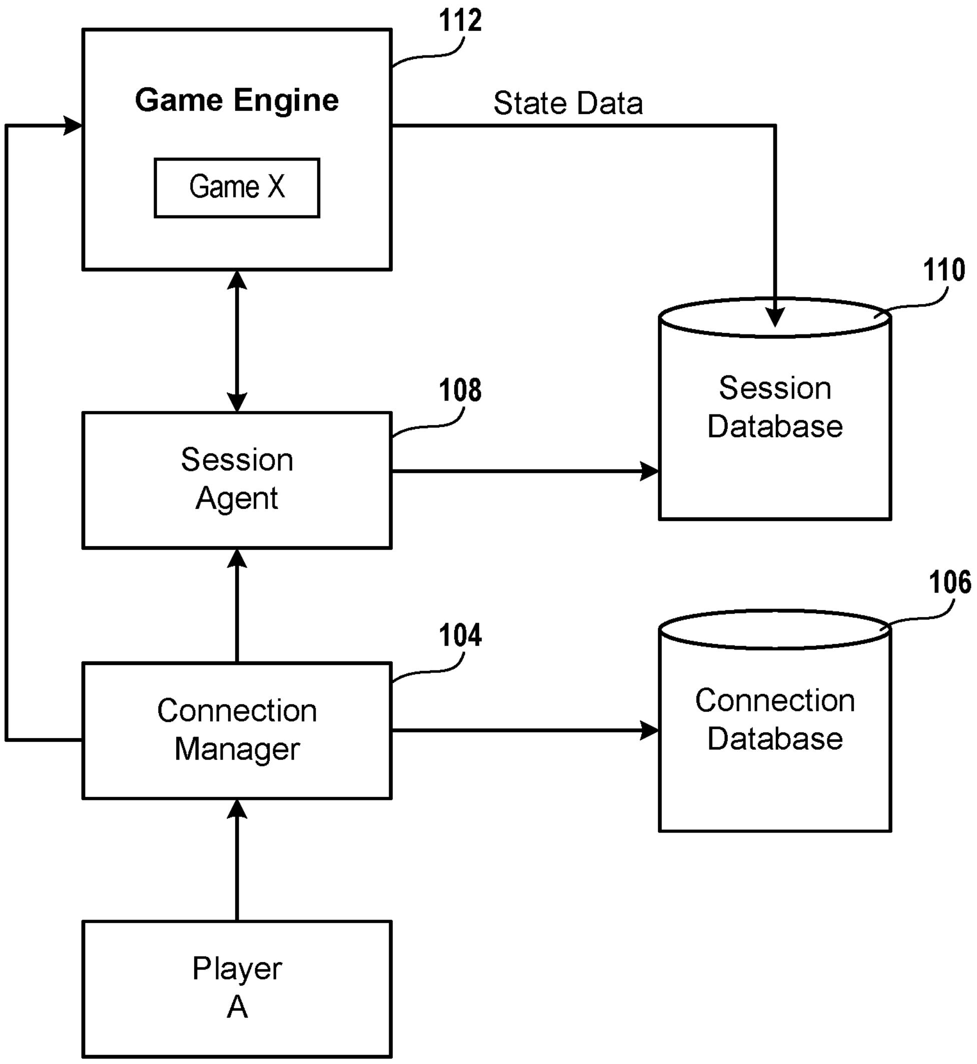
FIG. 2 is a simplified schematic diagram that illustrates the manner in which game duration metrics are collected during a gaming session, in accordance with one embodiment.

FIG. 2 is a simplified schematic diagram that illustrates the manner in which game duration metrics are collected during a gaming session, in accordance with one embodiment. As shown in FIG. 2, Player A is connected with connection manager 104 to game engine 112 to play Game X. As is known to those skilled in the art, game engine 112 includes various game components that game logic 114 uses to enable Game X to be run. In embodiments involving streaming gaming, the game engine 112 is executed on a game server, e.g., game server 102 of gaming service 100 (see FIG. 1). In embodiments involving multiplayer online gaming, the game engine 112 is executed on the game consoles of each of the players and state data regarding the other players is transmitted to each of the game consoles by a game server, as described in more detail above. Connection manager 104 is in communication with connection database 106 and session agent 108. Session agent 108 is in communication with session database 110 and game engine 112. Game engine 112 is in communication with session database 110.

To play Game X via the gaming service, Player A first connects with the connection manager 104. In one embodiment, Player A connects with connection manager 104 by clicking on a user interface for Game X. The connection manager 104 starts session agent 108 and communicates with the game engine 112 to run Game X. Once a gaming session is established and gameplay of Game X starts between Player A and one or more other players, the game engine 112 generates state data regarding the gameplay and outputs the state data for population to the session database 110, as will be described in more detail with reference to FIG. 3. During the gaming session, connection manager 104 sends connection use data regarding gameplay of Game X by Player A to the connection database 106. Also during the gaming session, session agent 108 sends additional contextual data related to the gaming session to the session database 110. Additional details regarding the connection database 106 and the session database are set forth below with reference to FIG. 3.

FIG. 3 is a simplified schematic diagram that show additional details regarding the connection database and the session database, in accordance with one embodiment. As described above with reference to FIG. 2, during a gaming session the connection manager 104 sends connection use data regarding gameplay to the connection database 106. In one embodiment, as shown in FIG. 3, the connection database 106 stores the connection use data in tables and the connection use data for each player is stored in a separate table. As shown in FIG. 3, Table 200-1 of connection database 106 includes the connection use data for Player A, Table 200-2 includes the connection use data for Player B, and Table 200-3 includes the connection use data for Player N.

In one embodiment, the connection use data includes the date and time the player connected to the game (indicated in the tables as "connected"), the date and time the player disconnected from the game ("disconnected"), the total duration of time the player spent playing the game ("total duration"), the particular game that was played ("game"), the identity of the other players that played the game during the gaming session ("other players"), and the number of the gaming session for the player ("session"), where the number of the gaming session corresponds to the cumulative number of gaming sessions in which the player has participated. As can be seen in Table 200-1, in session 1, Player A played Game X with two other players: Player B and Player N. Player A connected to the game on Jan. 1, 2022 (2022-01-01) at 6 pm (18:00:00) and disconnected from the game at 8:10 pm (20:10:00). The total duration of gameplay by Player A in session 1 was 2 hours and 10 minutes (2:10:00). Additional information regarding session 1 for Player A is also contained in session database 110, as will be explained in more detail below.

As described above, during a gaming session, session database 110 receives contextual data relating to the gaming session. In one embodiment, the contextual data relating to the gaming session includes session data from the session agent 108 (see FIG. 2) and state data regarding gameplay from the game engine 112. In one embodiment, as shown in FIG. 3, the session database 110 stores the contextual data related to gaming sessions in tables and the contextual data related to gaming sessions for each player is stored in a separate table. As shown in FIG. 3, Table 250-1 of session database 110 includes contextual data related to gaming sessions for Player A, Table 250-2 includes contextual data related to gaming sessions for Player B, and Table 250-3 includes contextual data related to gaming sessions for Player N.

Table 250-1 of FIG. 3 shows the contextual data related to gaming session 1 for Player A. Gaming session 1 for Player A shown in Table 250-1 of session database 110 corresponds to gaming session 1 for Player A shown in Table 200-1 of connection database 106. Thus, both Table 200-1 of connection database 106 and Table 250-1 of session database 110 indicate that the total duration of gaming session 1 for Player A was 2 hours and 10 minutes. Table 250-1 of session database 110 further includes session data received from the session agent 108 (see FIG. 2) regarding the time the other players, namely Player B and Player N, spent playing Game X during gaming session 1. In particular, as can be seen in Table 250-1, Player B played the game for 1 hour and 30 minutes (1:30:00) during gaming session 1 for Player A and Player N played the game for 15 minutes (0:15:00) during gaming session 1 for Player A.

Table 250-1 of the session database 110 also includes state data regarding gameplay received from game engine 112. In one embodiment, the state data regarding gameplay received from game engine 112 includes state data that corresponds to the game context in which other players involved in the gaming session left the game. During gaming session 1 for Player A, which lasted for 2 hours and 10 minutes, Player B played for 1 hour and minutes and Player N played for 15 minutes. As such, Table 250-1 includes the state data regarding gameplay at the time Player B left the game ("Exit Player B") and the state data regarding gameplay at the time Player N left the game ("Exit Player N"). By way of example, if Game X were a car racing game and Player B left the game when a crash occurred and a yellow caution flag was issued, then the state data "game context" for Exit Player B included in Table 250-1 is state data that corresponds to this caution flag scenario. In another example, if Game X were a golfing game and Player N left the game after making a triple bogey on a hole, then the state data "game context" for Exit Player N included in Table 250-1 is state data that corresponds to this triple bogey scenario.

Turning now to Table 250-2 of session database 110, this table shows the contextual data related to gaming session 2 for Player B. In gaming session 2, Player B played Game C (see Table 200-2 of connection database 104 for this information) for 1 hour, 15 minutes, and 10 seconds with Player F and Player J. As can be seen in Table 250-2, Player J played Game C for 18 minutes during gaming session 2 for Player B. On the other hand, Player F also played Game C for 1 hour, 15 minutes, and 10 seconds. In other words, Player F played the game for the entirety of gaming session 2 for Player B. As Player F played the entirety of the gaming session, the state data "game context" for Exit Player F included in Table 250-2 is state data that corresponds to the stage of Game C at which gaming session 2 for Player B was completed.

Figure 4:
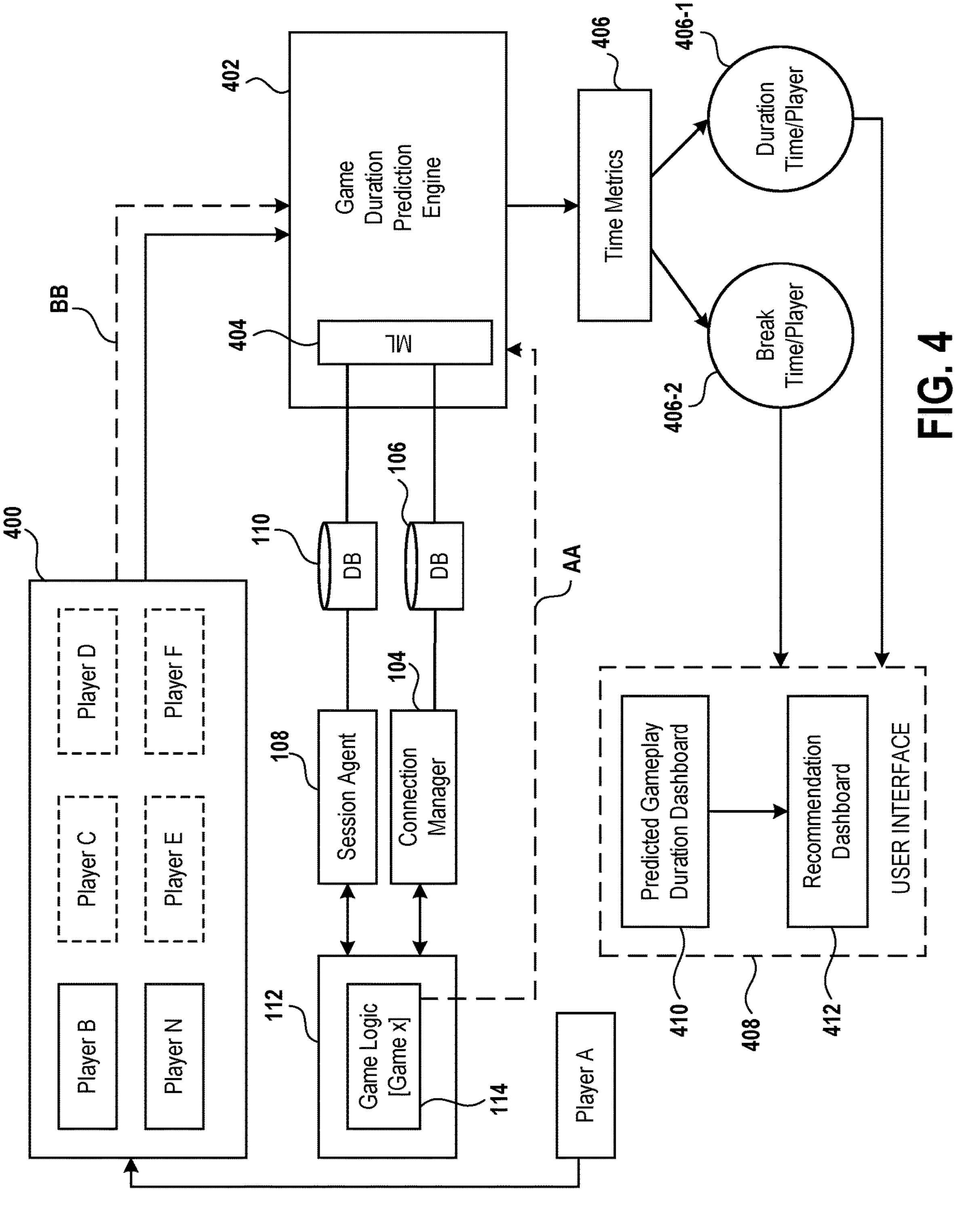
FIG. 4 is a simplified schematic diagram that illustrates the generation of game duration metrics, in accordance with one embodiment.

FIG. 4 is a simplified schematic diagram that illustrates the generation of game duration metrics, in accordance with one embodiment. In the example shown in FIG. 4, Player A has logged onto a gaming service, e.g., gaming service 100 shown in FIG. 1, and clicked on the appropriate interface to initiate the process of playing Game X. Upon receiving Player A's request to play Game X, the gaming service generates a player pool 400 that includes a list of other players who want to play Game X and causes the player pool to be provided to Player A, e.g., via a suitable user interface. Upon generation of the player pool 400, in the back end of the gaming service, game duration prediction engine 402 processes data including, among other metrics, an historical duration metric, regarding the players in player pool 400 as well as Player A and, as will be explained in more detail below, generates predictions regarding how long each of these players is likely to play Game X.

In the example shown in FIG. 4, Player A has selected Player B and Player N as potential players with whom to play Game X, and these selected players are indicated in FIG. 4 using rectangles formed with solid lines. The non-selected players in player pool 400, namely, Player C, Player D, Player E, and Player F, are indicated using rectangles formed with dashed lines. Upon receiving Player A's selection of Player B and Player N as potential players with whom to play Game X, the game duration prediction engine 402 outputs time metrics 406 for each of Player A, Player B, and Player N. In one embodiment, the time metrics 406 are output as a metadata file and the time metrics for each player include time metric 406-1, which is the duration of the time the player is predicted to play the game, and time metric 406-2, which is the duration and frequency of gameplay breaks the player is predicted to take while playing the game. The time metrics 406 can be displayed to the applicable player as part of the gaming service via a suitable user interface 408. In one embodiment, the user interface 408 includes one or both of a predicted gameplay duration dashboard 410 and a recommendation dashboard 412. Additional details regarding the predicted gameplay duration dashboard 410 and the recommendation dashboard 412 are described below with reference to FIGS. 5A and 5B, respectively.

In one embodiment, the game duration prediction engine 402 generates the time metrics 406 using data pulled from the connection database 106 and the session database 110. In one embodiment, the data pulled from connection database 106 includes an historical duration metric, e.g., connection time, for playing a game, e.g., Game X, to be played by players assembled for a gaming session, e.g., Player A, Player B, and Player N. In one embodiment, the data pulled from the session database 110 includes contextual data related to the gaming session to be played by the assembled players. In some embodiments, the game duration prediction engine 402 also accesses calendar data from the players to generate the time metrics 406. In particular, the calendar data can be used to improve the predictions regarding the potential end of a gaming session by, for example, identifying when a player has a scheduled event that overlaps with a gaming session. The game duration prediction engine 402 uses machine learning algorithms 404 to process the data pulled from the connection database 106 and the session database 110 and generate predictions, as will be explained in more detail below. In embodiments in which calendar data from the players is used, the machine learning algorithms 404 also can be used to process the calendar data.

In one embodiment, the machine learning algorithms 404 use a machine learning training process to generate a game duration prediction model for predicting how long a player will play a particular game. In this machine learning training process, data from many sessions of gameplay by the player is collected for use in generating the game duration prediction model. In one embodiment, for each player, the collected data includes the total duration of the connection time for each gaming session, the particular game being played, the other players in the gaming session, the total duration of the connection time for each of the other players in the gaming session, and state data related to the game context in which each of the other players left the gaming session. In some embodiments, e.g., embodiments in which supervised learning techniques are used, the machine learning processing requires identification and classification of the data content. To facilitate identification of the data content in these embodiments, the collected data can be labeled using various label generators. The labels generated by the label generators can then be classified into identifiable classes for use in the model.

In some embodiments, the game duration prediction model is a neural network that uses the various labels and classifications to create relationships that form the model. The relationships that form the game duration prediction model are used to predict time metrics regarding how long a player will play a particular game. In one embodiment, the predicted time metrics include not only the duration of the time the player is predicted to play the game, but also the duration and frequency of gameplay breaks the player is predicted to take while playing the game. In some embodiments, the game duration prediction model uses machine learning techniques to adjust the model over the course of time and thereby generate better predictions as data from more gaming sessions is included in the model. In some embodiments, the machine learning algorithms 404 use reinforcement learning algorithms to train the game duration prediction model to generate better predictions over the course of time.

In one embodiment, the game engine 112 communicates with the game duration prediction engine 402 during gaming sessions, as indicated by the dashed arrow AA in FIG. 4. This enables the game duration prediction engine 402 to continuously update the time metrics 406 based on the state of gameplay during a gaming session. For example, if a player has a history of leaving a golfing game whenever the player hits the ball into a water hazard, the game duration prediction engine 402 will update the time metrics 406 for the player to take this behavior into account. In particular, if the gaming session to be played includes only one hole with a water hazard, the game duration prediction engine 402 would likely increase the predicted duration of time the player will play the game (time metric 406-1) once the player has finished that hole without hitting the ball into the water hazard.

In one embodiment, the game duration prediction engine 402 reexecutes the generation of time metrics 406 whenever there is a change in the selected players. To this end, the gaming service communicates changes in the players selected from the list of players in player pool 400 to the game duration prediction engine 402, as indicated by the dashed arrow BB in FIG. 4. In the example illustrated in FIG. 4 in which Player A has selected Player B and Player N to play Game X, if Player A were to remove Player B and select Player C instead (so the selected players would be Player C and Player N), the game duration prediction engine 402 would, upon receiving the change in selected players, generate predicted time metrics 406 for the newly assembled group of players, namely Player A, Player C, and Player N.

Figure 5A:
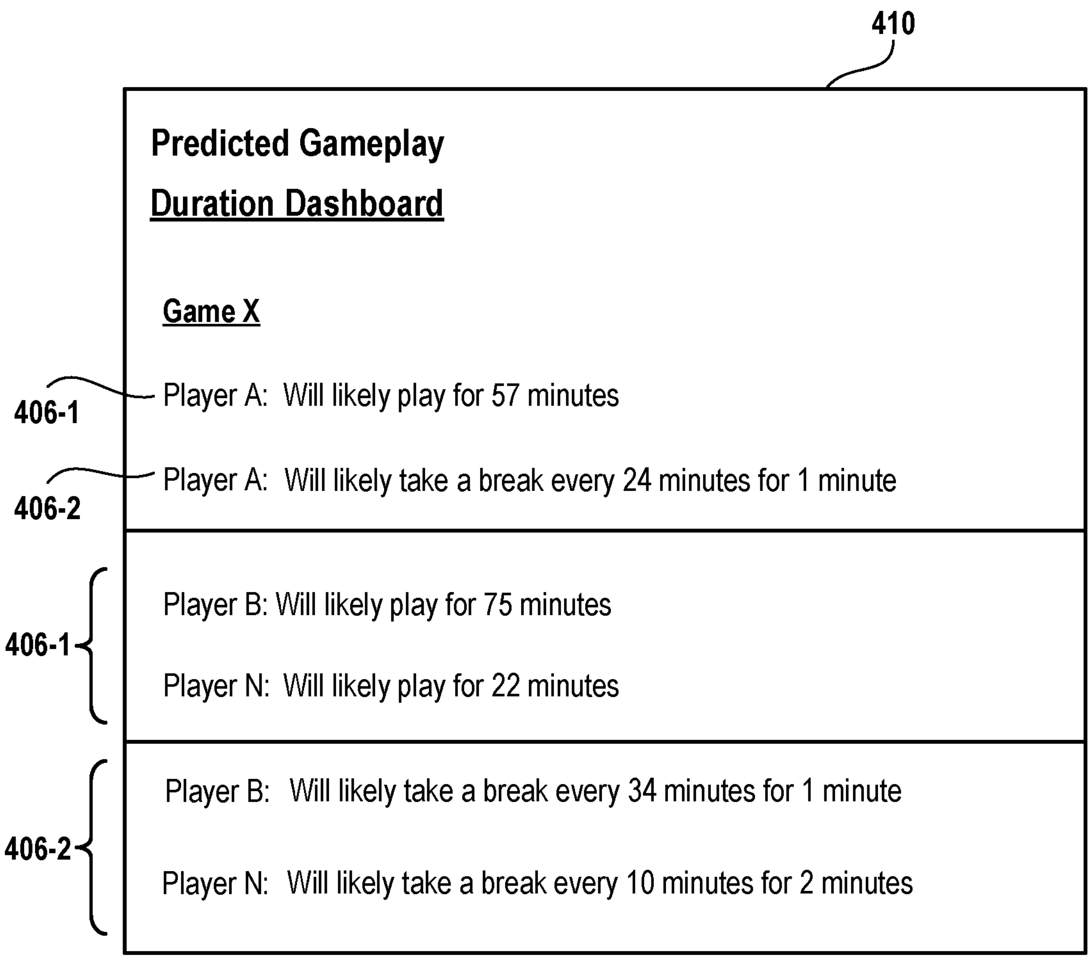
FIG. 5A shows additional details of the predicted gameplay duration dashboard, in accordance with one embodiment.

FIG. 5A shows additional details of the predicted gameplay duration dashboard, in accordance with one embodiment. As shown in FIG. 5A, predicted gameplay duration dashboard 410 includes an indication of the game to be played (Game X) and time metrics 406-1 and 406-2 generated for each of Player A, Player B, and Player N. As can be seen in FIG. 5A, the time metrics for Player A are shown on top of the respective time metrics 406-1 and 406-2 for each of Player B and Player N (the players were selected by Player A as potential players with whom to play Game X). As shown in FIG. 5A, time metric 406-1 for Player A is indicated as “will likely play for 57 minutes” and time metric 406-2 for Player A is indicated as “will likely take a break every 24 minutes for 1 minute.” The time metric 406-1 for each of Player B and Player N is shown immediately below the time metrics for Player A. In particular, the time metric 406-1 for Player B is indicated as “will likely play for 75 minutes” and the time metric 406-1 for Player N is indicated as “will likely play for 22 minutes.” The time metric 406-2 for each of Player B and Player N is show immediately below the time metric 406-1 for each of these players. In particular, the time metric 406-2 for Player B is indicated as “will likely take a break every 34 minutes for 1 minute” and the time metric 406-2 for Player N is indicated as “will likely take a break every 10 minutes for 2 minutes.” In the event Player A were to change the selected players, e.g., Player B was removed in favor of Player C, and the game duration prediction engine 402 generated predicted time metrics for the newly assembled group of players, the predicted gameplay duration dashboard 410 would be updated to display the time metrics for this group of players, namely Player A, Player C, and Player N. It will be apparent to those skilled in the art that the format of the predicted gameplay duration dashboard 410 shown in FIG. 5A as well as the content included therein can be modified to suit the needs of particular applications.

Figure 5B:
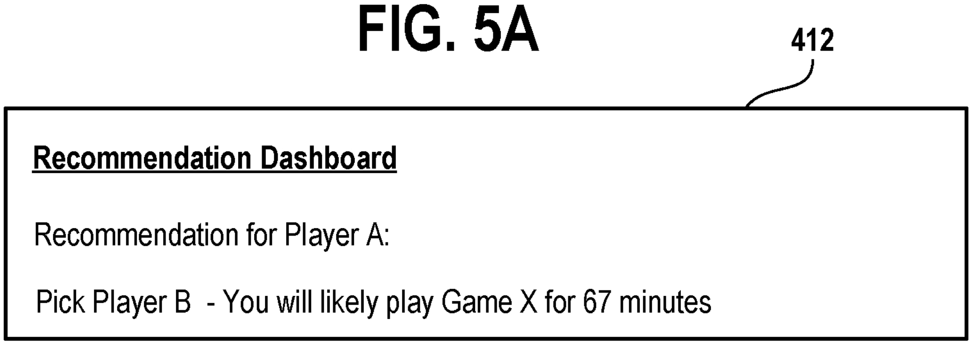
FIG. 5B shows additional details of the recommendation dashboard, in accordance with one embodiment.

FIG. 5B shows additional details of the recommendation dashboard, in accordance with one embodiment. The recommendation dashboard 412 includes, in one embodiment, an indication of the player (or players) which the game duration prediction engine 402 recommends for playing a particular game. As shown in FIG. 5B, the recommendation dashboard 412 includes an indication of the recommendation that Player A should pick Player B to play Game X. In particular, the recommendation for Player A is indicated as “Pick Player B— you will likely play Game X for 67 minutes.” It will be apparent to those skilled in the art that the format of the recommendation dashboard 412 shown in FIG. 5B as well as the content included therein can be modified to suit the needs of particular applications. By way of example, in one embodiment, the recommendation dashboard can be modified to include a recommended time for the gameplay to be paused so the players can take a break. In one embodiment, the game duration prediction engine 402 accesses calendar data of the players and uses this calendar data in the process of generating the recommended time for gameplay to be paused to increase the likelihood that recommended time for the break is amenable to each of the players.

In one embodiment, the game duration prediction engine 402 monitors the state of gameplay to ensure that the players take enough breaks during longer gaming sessions. If the game duration prediction engine 402 determines that the players have played for a relatively long period of time, e.g., 1 hour or longer, without taking a break, the game duration prediction engine can cause the recommendation dashboard 412 to provide a recommendation that the players pause the game and take a break. By way of example, the recommendation could be indicated as “Time for a water break!” or “Wow, this is a long session, you should rest your eyes for a few.” In some embodiments, the game duration prediction engine 402 can synchronize the time at which recommendations for breaks are issued with the current state of gameplay so that the players take breaks at points in the game that are best suited for pausing gameplay.

In yet another embodiment, the game duration prediction engine 402 can include logic to determine or suggest if a team, e.g., a team including Player A, Player B, and Player N, should play another game or switch up teammates based on their gameplay history. In the case of team-based games, the estimated duration time for play of the gaming session generated by the game duration prediction engine 402 can be for one or all of the teams that play during the gaming session. In some embodiments, programmed logic associated with the game duration prediction engine 402 can take into consideration an average time it takes to get to another stopping point in gameplay or the average time it takes to complete a round/match in the particular game.

In the event Player A wants to play Game X with Player B in accordance with the recommendation provided in the recommendation dashboard 412, a gaming session cannot be executed until Player B provides an indication that the gaming session should proceed. Thus, in one embodiment, the user interface 408, which includes recommendation dashboard 412, is configured to enable Player A to click on a button or other suitable graphical user interface (GUI) to accept the recommendation to play Game X with Player B and to send an invitation to Player B to play Game X. In one embodiment, the gaming service 100 generates display data for rendering to Player B an invitation to play Game X with Player A which includes the estimated duration time for a gaming session with Player A. In the event that Player B accepts the invitation, e.g., by clicking on a button or other suitable GUI, the gaming service will begin executing a gaming session for Game X with Player A and Player B.

Figure 6:
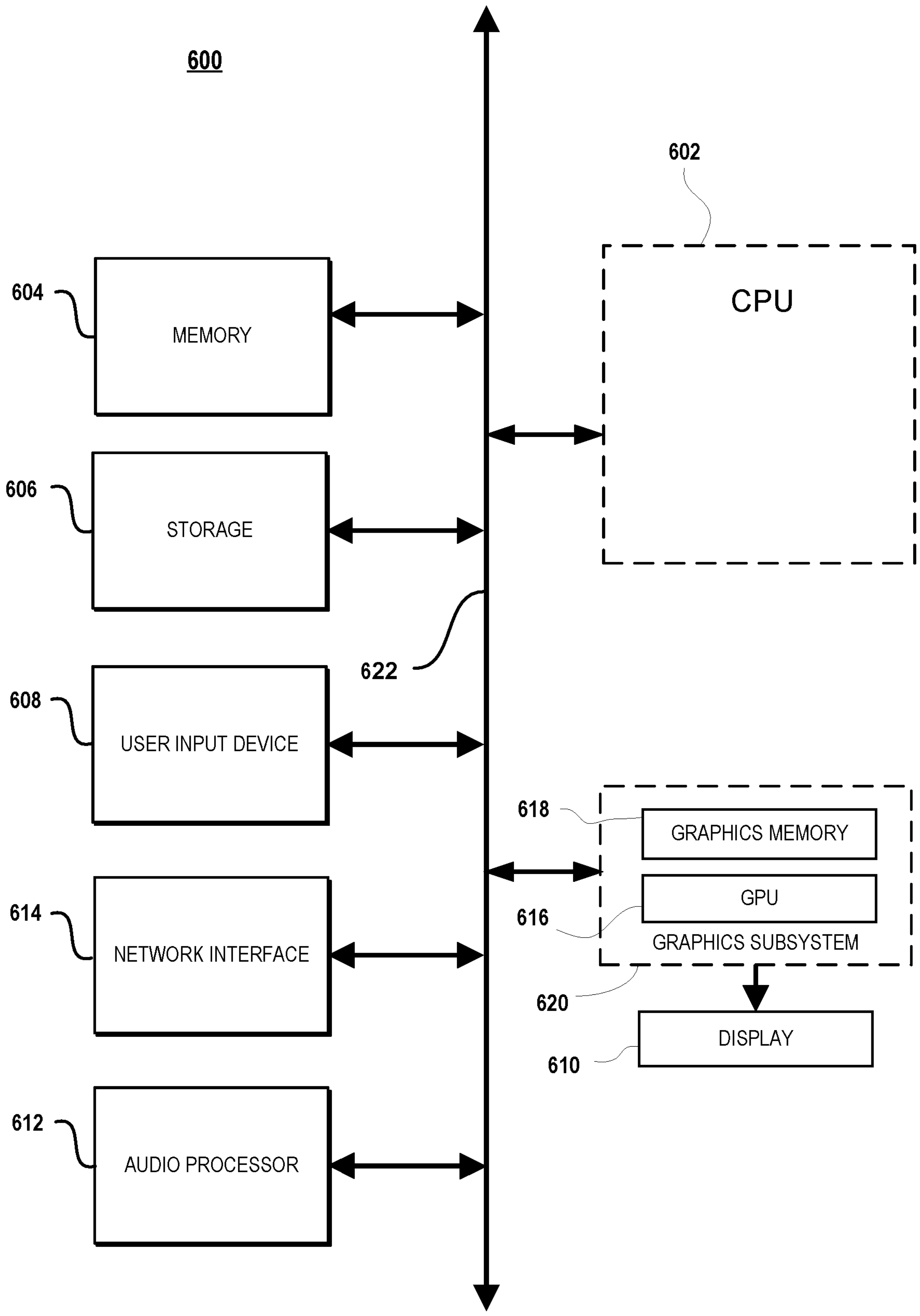
FIG. 6 is a schematic diagram of a computing system and components, which may be used in accordance with one or more embodiments of the disclosure.

FIG. 6 illustrates components of an example device 600 that can be used to perform aspects of the various embodiments of the present disclosure. This block diagram illustrates a device 600 that can incorporate or can be a personal computer, video game console, personal digital assistant, a server or other digital device, suitable for practicing an embodiment of the disclosure. Device 600 includes a central processing unit (CPU) 602 for running software applications and optionally an operating system. CPU 602 may be comprised of one or more homogeneous or heterogeneous processing cores. For example, CPU 602 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 600 may be a localized to a player playing a game segment (e.g., game console), or remote from the player (e.g., back-end server processor), or one of many servers using virtualization in a game cloud system for remote streaming of gameplay to clients.

Memory 604 stores applications and data for use by the CPU 602. Storage 606 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 608 communicate user inputs from one or more users to device 600, examples of which may include keyboards, mice, joysticks, touch pads, touch screens, still or video recorders/cameras, tracking devices for recognizing gestures, and/or microphones. Network interface 614 allows device 600 to communicate with other computer systems via an electronic communications network, and may include wired or wireless communication over local area networks and wide area networks such as the internet. An audio processor 612 is adapted to generate analog or digital audio output from instructions and/or data provided by the CPU 602, memory 604, and/or storage 606. The components of device 600, including CPU 602, memory 604, data storage 606, user input devices 608, network interface 610, and audio processor 612 are connected via one or more data buses 622.

A graphics subsystem 620 is further connected with data bus 622 and the components of the device 600. The graphics subsystem 620 includes a graphics processing unit (GPU) 616 and graphics memory 618. Graphics memory 618 includes a display memory (e.g., a frame buffer) used for storing pixel data for each pixel of an output image. Graphics memory 618 can be integrated in the same device as GPU 608, connected as a separate device with GPU 616, and/or implemented within memory 604. Pixel data can be provided to graphics memory 618 directly from the CPU 602. Alternatively, CPU 602 provides the GPU 616 with data and/or instructions defining the desired output images, from which the GPU 616 generates the pixel data of one or more output images. The data and/or instructions defining the desired output images can be stored in memory 604 and/or graphics memory 618. In an embodiment, the GPU 616 includes 3D rendering capabilities for generating pixel data for output images from instructions and data defining the geometry, lighting, shading, texturing, motion, and/or camera parameters for a scene. The GPU 616 can further include one or more programmable execution units capable of executing shader programs.

The graphics subsystem 620 periodically outputs pixel data for an image from graphics memory 618 to be displayed on display device 610. Display device 610 can be any device capable of displaying visual information in response to a signal from the device 600, including CRT, LCD, plasma, and OLED displays. Device 600 can provide the display device 610 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the internet, based on how the internet is depicted in computer network diagrams and is an abstraction for the complex infrastructure it conceals.

A game server may be used to perform the operations of the durational information platform for video game players, in some embodiments. Most video games played over the internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as HTML, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although method operations may be described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the telemetry and game state data are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation may be produced by an emulator. In either case, if the video game is represented as a simulation, that simulation is capable of being executed to render interactive content that can be interactively streamed, executed, and/or controlled by user input.

Accordingly, the disclosure of the example embodiments is intended to be illustrative, but not limiting, of the scope of the disclosures, as set forth in the following claims. Although example embodiments of the disclosures have been described in some detail for purposes of clarity of understanding, it will be apparent that certain changes and modifications can be practiced within the scope and equivalents of the following claims. In the following claims, elements and/or steps do not imply any particular order of operation, unless explicitly stated in the claims or implicitly required by the disclosure.

What is claimed is:

1. A method for generating game duration metrics, comprising:

assembling a gaming session for a game, the gaming session identifies a first player and a second player;

accessing a database that includes a historical duration metric for playing the game by each of the first player and the second player;

accessing contextual data related to the gaming session to be played by the first player and the second player;

generating a prediction of time metrics for the first player and the second player, the predicted time metrics providing an estimated duration time for play of the gaming session; and executing the gaming session for the first player and the second player, the estimated duration time for play of the gaming session being updated periodically as the gaming session is progressed by the first player and the second player.

2. The method of claim 1, further comprising:

receiving a selection of a third player and removal of the second player; and reexecuting the generating of the prediction of the time metrics to generate predicted time metrics for the first player and the third player.

3. The method of claim 1, wherein the accessing of the database that includes the historical duration metric includes accessing a connection database that includes connection use data regarding gameplay of the game by a player.

4. The method of claim 3, wherein the connection use data regarding gameplay of the game by the player includes metadata identifying a connection time for the player, a disconnection time for the player, and a total duration of gameplay of the game by the player.

5. The method of claim 1, wherein the accessing of the contextual data related to the gaming session to be played by the first player and the second player includes accessing a session database that includes metadata regarding a gaming session and state data regarding the gaming session.

6. The method of claim 5, wherein the metadata regarding the gaming session includes metadata regarding duration of the gaming session and metadata regarding connection time for players in the gaming session.

7. The method of claim 5, wherein the state data regarding the gaming session includes state data regarding a state of gameplay in the gaming session, state data regarding players involved in the gaming session, state data regarding players leaving the gaming session, and state data regarding a game context in which a player left the gaming session.

8. The method of claim 1, wherein the predicted time metrics also provide estimated duration times for gameplay breaks taken during the gaming session.

9. The method of claim 1, further comprising:

generating display data for rendering to one or both of the first player and the second player to display the estimated duration time for play of the gaming session; and receiving an indication from the first player and the second player that the gaming session is to proceed before executing the gaming session.

10. The method of claim 1, further comprising:

generating display data for rendering to the first player a recommendation to proceed with the executing of the gaming session with the second player.

11. A method for generating game duration metrics, comprising:

assembling a gaming session for a game, the gaming session identifies a first player and one or more other players;

accessing a database that includes a historical duration metric for playing the game by the first player and at least one of the one or more other players;

accessing contextual data related to the gaming session to be played by the first player and at least one of the other players;

generating a prediction of time metrics for the first player and at least one of the one or more other players, the predicted time metrics providing an estimated duration time for play of the gaming session; and executing the gaming session for the first player and at least one of the one or more other players, the estimated duration time for play of the gaming session being updated periodically as the gaming session is progressed by the first player and at least one of the one or more other players.

12. The method of claim 11, wherein the accessing of the database that includes the historical duration metric includes accessing a connection database that includes connection use data regarding gameplay of the game by a player.

13. The method of claim 12, wherein the connection use data regarding gameplay of the game by the player includes metadata identifying a connection time for the player, a disconnection time for the player, and a total duration of gameplay of the game by the player.

14. The method of claim 11, wherein the accessing of the contextual data related to the gaming session to be played by the first player and at least one of the one or more other players includes accessing a session database that includes metadata regarding a gaming session and state data regarding the gaming session.

15. The method of claim 14, wherein the metadata regarding the gaming session includes metadata regarding duration of the gaming session and metadata regarding connection time for players in the gaming session.

16. The method of claim 15, wherein the state data regarding the gaming session includes state data regarding a state of gameplay in the gaming session, state data regarding players involved in the gaming session, state data regarding players leaving the gaming session, and state data regarding a game context in which a player left the gaming session.

17. The method of claim 11, wherein the predicted time metrics also provide estimated duration times for gameplay breaks taken during the gaming session.

18. The method of claim 11, further comprising:

generating display data for rendering to either the first player or to the first player and at least one of the one or more other players to display the estimated duration time for play of the gaming session; and receiving an indication from the first player and at least one of the one or more other players that the gaming session is to proceed before executing the gaming session.

19. The method of claim 11, further comprising:

generating display data for rendering to the first player a recommendation to proceed with the executing of the gaming session with one or more of the one or more other players.

20. The method of claim 11, wherein the estimated duration time for play of the gaming session is for the first player, a second player and one or more of the one or more other players that are assembled to play together in the gaming session or for a team that plays a team-based game during the gaming session, the team including the first player, the second player, and one or more of the one or more other players.

21. A non-transitory computer readable medium containing program instructions for generating game duration metrics, wherein execution of the program instructions by one or more processors of a computer system causes the one or more processors to carry out operations of:

assembling a gaming session for a game, the gaming session identifies a first player and a second player;

accessing a database that includes a historical duration metric for playing the game by each of the first player and the second player;

accessing contextual data related to the gaming session to be played by the first player and the second player;

generating a prediction of time metrics for the first player and the second player, the predicted time metrics providing an estimated duration time for play of the gaming session; and executing the gaming session for the first player and the second player, the estimated duration time for play of the gaming session being updated periodically as the gaming session is progressed by the first player and the second player.

* * * * *